(12) United States Patent
Vandine

(10) Patent No.: US 9,416,840 B2
(45) Date of Patent: Aug. 16, 2016

(54) GAS SPRING

(75) Inventor: Jason L. Vandine, Redford, MI (US)

(73) Assignee: DADCO, INC., Plymouth, MI (US)

( * ) Notice: Subject to any disclaimer, the term of this patent is extended or adjusted under 35 U.S.C. 154(b) by 266 days.

(21) Appl. No.: 13/356,006

(22) Filed: Jan. 23, 2012

(65) Prior Publication Data

US 2013/0187316 A1 Jul. 25, 2013

(51) Int. Cl.
*F16F 9/48* (2006.01)
*F16F 9/02* (2006.01)
*F16F 9/34* (2006.01)
*F16F 5/00* (2006.01)
*F16F 9/36* (2006.01)

(52) U.S. Cl.
CPC ............. *F16F 9/0227* (2013.01); *F16F 9/3405* (2013.01); *F16F 9/48* (2013.01); *F16F 9/36* (2013.01)

(58) Field of Classification Search
CPC ......... F16F 9/02; F16F 9/0209; F16F 9/0227; F16F 9/0281; F16F 9/3207; F16F 9/3214; F16F 9/34; F16F 9/36; F16F 9/362; F16F 9/369; F16F 9/49; F16F 9/58; F16F 9/3405; F16F 9/48
USPC ......... 267/64.11, 64.18, 64.22, 124; 188/288, 188/289, 313–316, 322.13, 322.15–322.19
See application file for complete search history.

(56) References Cited

U.S. PATENT DOCUMENTS

| | | | | |
|---|---|---|---|---|
| 2,924,304 | A * | 2/1960 | Patriquin | 188/288 |
| 3,447,644 | A * | 6/1969 | Duckett | 188/288 |
| 4,066,279 | A * | 1/1978 | Kaptanis | 267/64.11 |
| 4,078,638 | A * | 3/1978 | Koyama et al. | 188/288 |
| 4,326,402 | A | 4/1982 | Wallis | |
| 4,669,297 | A | 6/1987 | Fisch | |
| 5,325,943 | A * | 7/1994 | Ralph | 188/288 |
| 5,702,091 | A * | 12/1997 | Perrin et al. | 267/64.12 |
| 5,884,734 | A * | 3/1999 | Hiramoto et al. | 188/322.18 |
| 6,170,809 | B1 | 1/2001 | Cotter | |
| 6,491,143 | B1 | 12/2002 | Stenquist | |
| 6,848,290 | B2 | 2/2005 | Pyper et al. | |
| 7,121,538 | B2 | 10/2006 | Runesson et al. | |
| 7,152,451 | B1 | 12/2006 | Cotter | |
| 7,559,542 | B2 | 7/2009 | Cotter | |
| 8,490,763 | B2 * | 7/2013 | Vandine | 188/322.15 |
| 2007/0204448 | A1 | 9/2007 | Cotter et al. | |
| 2010/0230875 | A1 | 9/2010 | Vandine | |

* cited by examiner

*Primary Examiner* — Melody Burch
(74) *Attorney, Agent, or Firm* — Resing Ethington, P.C.

(57) ABSTRACT

A gas spring for forming equipment, including a piston received at least partially in a cylinder for reciprocation between extended and retracted positions, and including a throttling passage disposed between the piston and the cylinder in fluid communication between first and second pressure chambers during at least a portion of the reciprocation of the piston. The throttling passage is of variable cross-sectional area, which varies with a length of the passage to at least partially restrict gas flow therethrough in a manner varying with return of the piston toward its extended position to decelerate the piston at a predetermined rate.

18 Claims, 6 Drawing Sheets

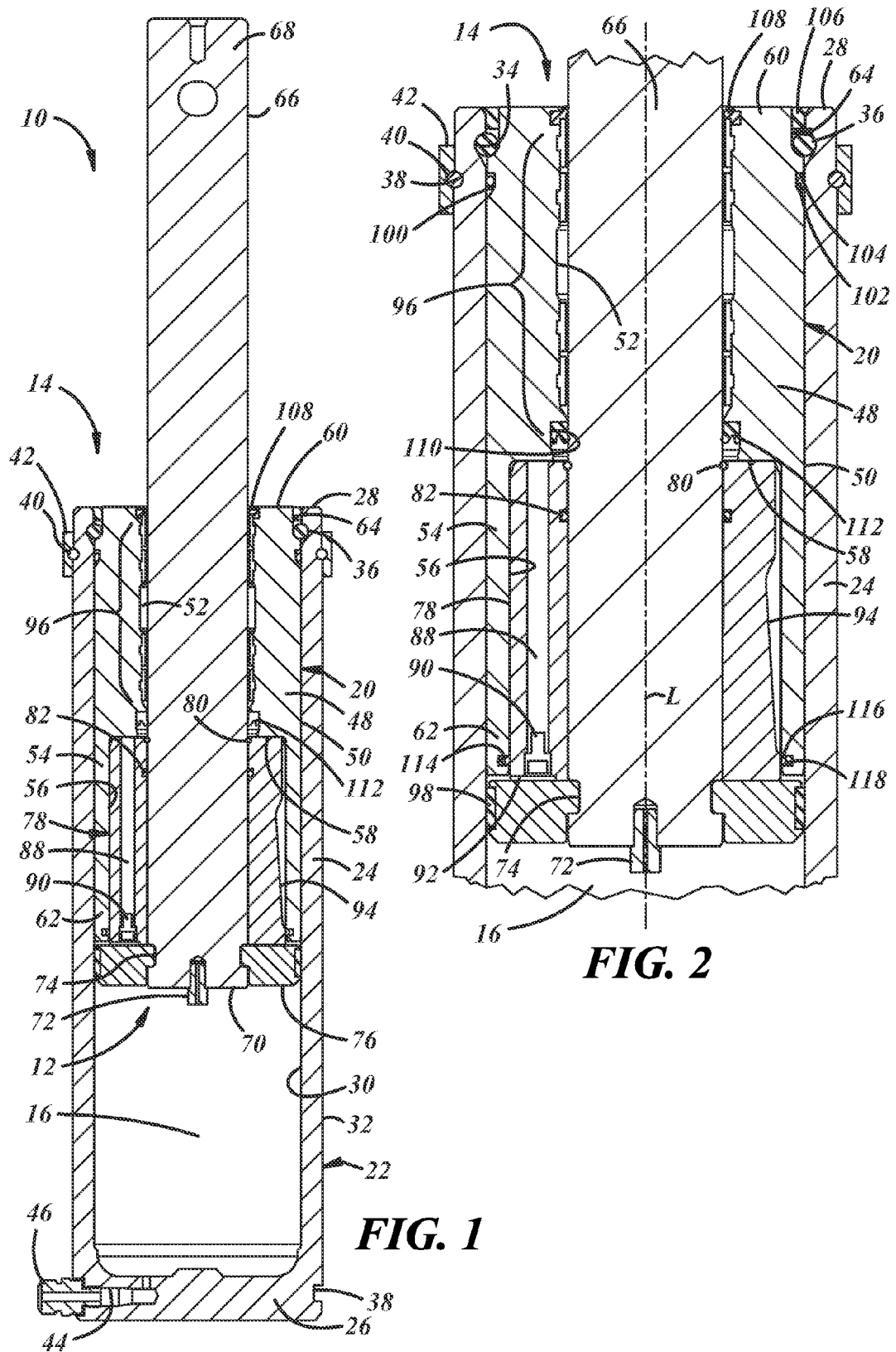

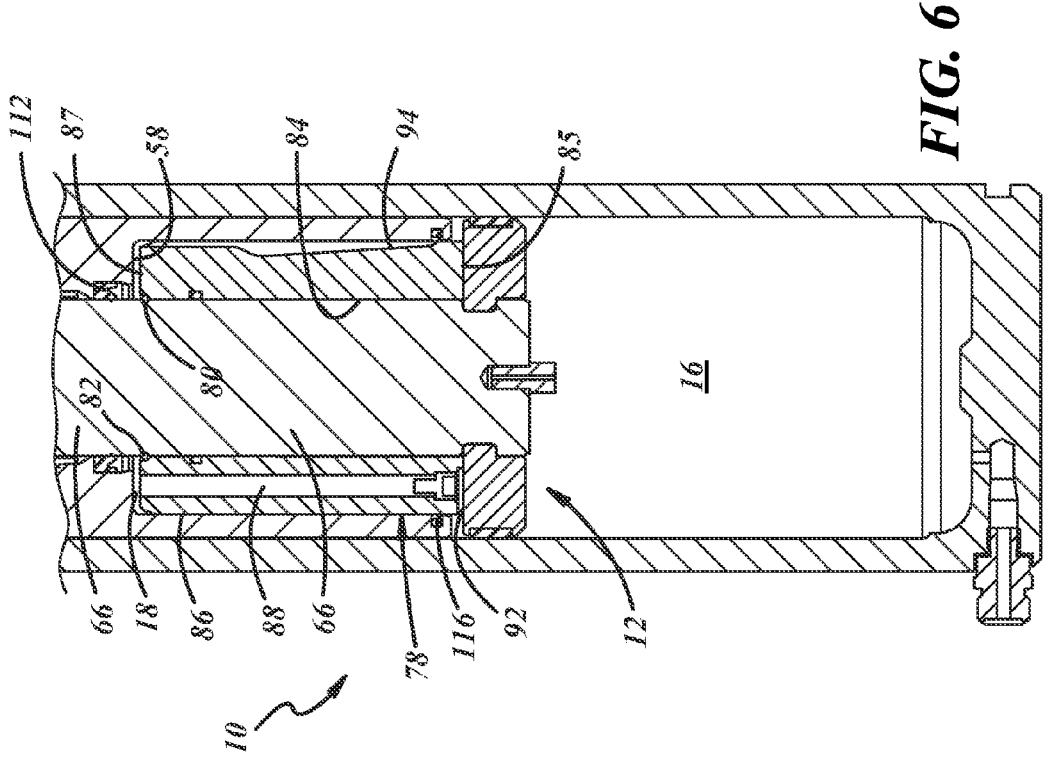
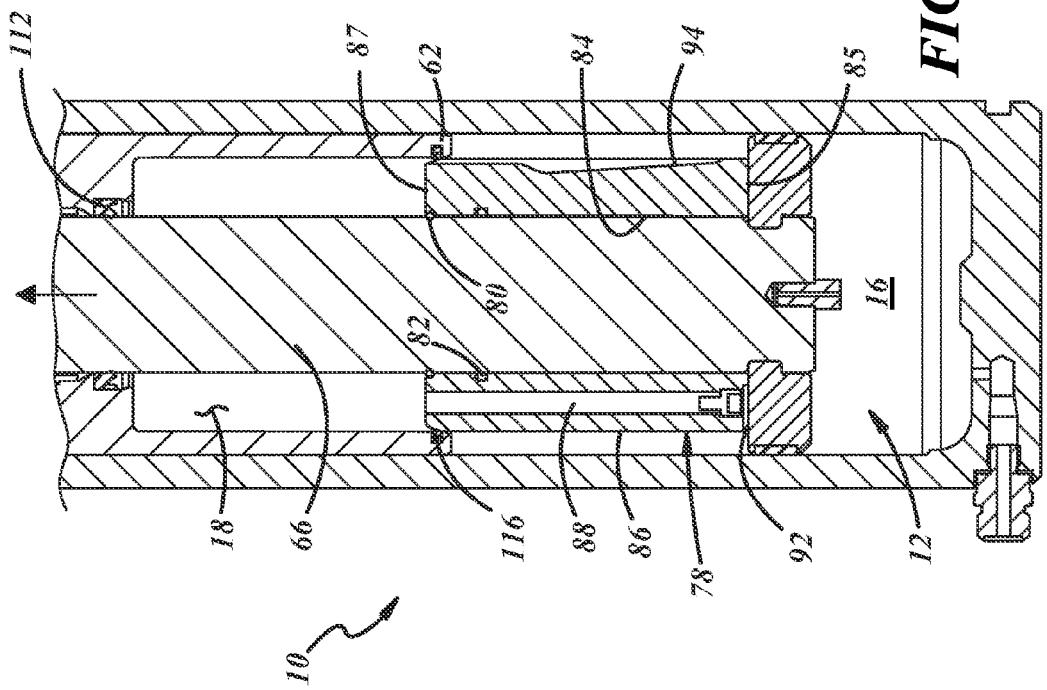

GAS SPRING

TECHNICAL FIELD

This disclosure relates generally to spring devices, and more particularly to gas springs for use with forming equipment including presses.

BACKGROUND

Gas springs are well known and have been used in dies of presses for sheet metal stamping operations. Gas springs commonly are used in various implementations in forming equipment to provide a moveable component or support of a forming die or a workpiece with a yielding force or a return force. For example, in a binder ring implementation, a gas spring provides a yielding force against a binder ring of a forming die to hold a metal workpiece while another part of the forming die forms, cuts, stretches, or bends the workpiece. In a lifter implementation, the gas spring provides a yielding force and return force to lift a workpiece off a surface of the forming die or to otherwise maintain control of the workpiece. In a cam tool implementation, the gas spring applies a yielding force to return a cam-activated tool to its home position. Of course, various springs including gas springs can be used in a wide range of other implementations.

Conventional gas springs usually include a cylinder, a piston disposed in the cylinder, a pressure chamber between the piston and cylinder, and various retainers and seals disposed in the cylinder to retain the piston and prevent leakage of pressurized gas from the pressure chamber. Typically, the pressurized gas provides a force on the piston to bias the piston toward an extended position and resists retraction of the piston from its extended position toward a retracted position.

SUMMARY

A gas spring for forming equipment according to an illustrative implementation includes a cylinder, and a piston at least partially received in the cylinder for reciprocation between extended and retracted positions over a cycle including a retraction stroke and a return stroke. The gas spring further includes a cushion seal disposed between the cylinder and the piston and, during at least a portion of the cycle, separating a first pressure chamber defined by the cylinder and the piston on one side of the cushion seal from a second pressure chamber defined by the cylinder and the piston on another side of the cushion seal. The gas spring also includes at least one check passage communicating at one end with the second pressure chamber and at an other end with the first pressure chamber, at least one check valve in the check passage, and at least one throttling passage disposed between the piston and the cylinder and communicating at one end with the second pressure chamber and at an other end with the first pressure chamber. The at least one throttling passage is configured to at least partially restrict gas flow therethrough in a manner varying with return of the piston so as to reduce velocity of the returning piston at a predetermined rate.

A gas spring for forming equipment according to another illustrative implementation includes a cylinder, and a piston received at least partially in the cylinder for reciprocation between extended and retracted positions and to partially define a first pressure chamber between one portion of the piston and the cylinder and to partially define a second pressure chamber between another portion of the piston and the cylinder. The gas spring also includes a throttling passage disposed between the piston and the cylinder in fluid communication between the first and second pressure chambers during at least a portion of the reciprocation of the piston, wherein a cross-sectional area of the throttling passage varies as a function of the length of the throttling passage to at least partially restrict gas flow therethrough in a manner varying with return of the piston toward its extended position to decelerate the piston at a predetermined rate.

A gas spring for forming equipment according to a further illustrative implementation includes a cylinder including a housing having an inner surface and a piston guide received at least partly in the housing and including a guide body having a through bore, an outer surface with a portion disposed generally adjacent to the inner surface of the housing, and a skirt. The gas spring also includes a piston carried by the cylinder for reciprocation between extended and retracted positions. The piston includes a piston rod received at least partially in the through bore of the body of the piston guide, and a cushion collar carried by the piston rod, received at least partially within the skirt of the body of the piston guide during at least a portion of the reciprocation of the piston. The gas spring further includes a piston rod seal disposed between the piston rod and the piston guide, and a cushion seal carried by the piston guide and constructed and arranged for contact with the cushion collar during at least a portion of the reciprocation of the piston. A first pressure chamber is defined by the housing and a portion of the piston on one side of the cushion seal when the cushion seal is in contact with the cushion collar, and a second pressure chamber is defined by another portion of the piston and the piston guide between the piston rod seal and the cushion seal when the cushion seal is in contact with the cushion collar. The gas spring additionally includes at least one throttling passage disposed between the piston and the cylinder and configured to at least partially restrict gas flow therethrough in a manner varying with return of the piston so as to decelerate the piston at a predetermined rate.

Some potential objects, features and advantages of the gas spring set forth herein include providing a device that is readily usable with a wide range of forming equipment, readily permits use of common components among gas springs of different configuration and construction, can be easily serviced and its components replaced as needed, can be used in a wide range of applications having different size and force requirements, is readily adaptable to a wide range of press configurations, reduces sudden impact at return to full extension of the gas spring to reduce part bounce and increase production efficiency, and is of relatively simple design, economical manufacture and assembly, is robust, durable, reliable and in service has a long and useful life. Of course, an apparatus embodying the present invention may achieve, none, some, all or different objects, features or advantages than set forth with regard to the illustrative embodiments disclosed herein.

BRIEF DESCRIPTION OF THE DRAWINGS

The following detailed description of illustrative embodiments and best mode will be set forth with reference to the accompanying drawings, in which:

FIG. 1 is a cross-sectional view of an illustrative embodiment of a gas spring with a piston shown in a fully extended or fully returned position;

FIG. 2 is an enlarged, fragmentary view of a portion of the gas spring of FIG. 1;

FIG. 5 is an enlarged, fragmentary view similar to FIG. 1 showing the piston moving back toward its fully returned position;

FIG. 6 is an enlarged, fragmentary view similar to FIG. 1 showing the piston moving back toward and near to its fully returned position;

DETAILED DESCRIPTION OF THE ILLUSTRATIVE EMBODIMENTS

Figure 4:
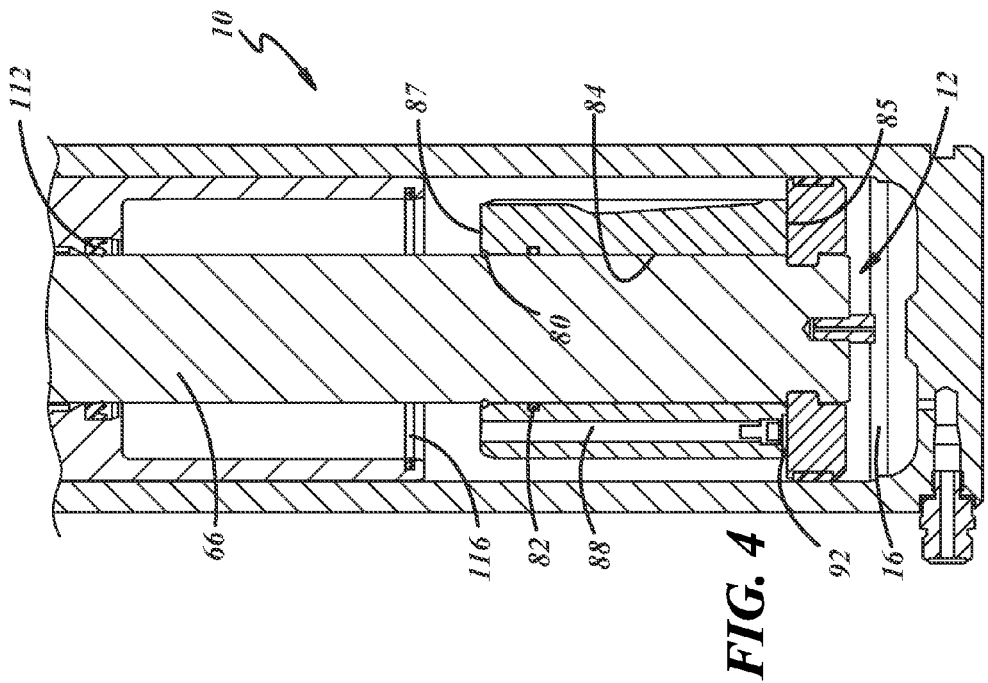
FIG. 4 is an enlarged, fragmentary view similar to FIG. 1 showing the piston moved further toward its retracted position.

Referring in more detail to the drawings, FIGS. 1 through 6 show an illustrative embodiment of a gas spring 10 for forming equipment, including presses, that includes a piston 12 at least partially received in a cylinder 14 of the gas spring 10 for reciprocation between an extended position (FIG. 1) and a retracted position (FIG. 4) over a cycle including a retraction stroke and a return stroke. The gas spring 10 may include multiple pressure chambers, and may be a dual-chamber gas spring.

For example, a first pressure chamber or spring chamber 16 may be defined at least in part between corresponding portions of the cylinder 14 and the piston 12 for receiving a pressurized gas therein to provide an extension or return force of the gas spring 10. Also, during at least a portion of a return or extension stroke of the piston 12, a second pressure chamber or cushion chamber 18 (FIGS. 3, 5, 6) may be established or defined at least in part between other corresponding portions of the piston 12 and the cylinder 14. Accordingly, the gas spring 10 may be a dual gas chamber product. The cushion chamber 18 may receive some of the pressurized gas from the spring chamber 16 to reduce or counteract the extension force, as explained in more detail below.

In general, the spring chamber 16 may be pressurized with nitrogen gas, or any other suitable gas, to determine the return or extension force of the spring 10. In the extended position of FIG. 1, the pressure in the chambers 16, 18 is equal and, as the piston 12 strokes from the extended position toward the retracted position which compresses gas in the spring chamber 16, gas flows freely from the spring chamber 16 to the cushion chamber 18 such that pressure in the chambers 16, 18 is equal. But as the piston 12 strokes back or returns to the extended position, gas flows between the spring chamber 16 and the cushion chamber 18 in a variably restricted manner to provide a desired pressure differential across the piston 12. The pressure differential may be variable and may produce a net force cycle that starts at a relatively high value, gradually increases over a retraction stroke, thereafter gradually decreases over at least a portion of an extension or return stroke, before rapidly (but controllably) decreasing over a final portion of the return stroke. The rapidly reduced net force offered by the gas spring 10 results, at least in part, from compression of gas in the cushion chamber 18, thereby producing a force in opposition to the force of the compressed gas in the spring chamber 16. In other words, when activated, pressure of gas in the cushion chamber 18 counteracts the force created by the pressure of the gas in the spring chamber 16 and causes the piston 12 to slow down.

But, as will be described in greater detail below, pressurized gas may be allowed to pass from the cushion chamber 18 to the spring chamber 16 during the final portion of the return stroke and at a predetermined rate according to throttling of the gas through a passage that has a cross-sectional area that varies as a function of the length of the passage. Such a construction provides full force and velocity during a full retraction portion of the operation cycle and for an initial part of an extension portion of the cycle. Also, such a construction allows for reduction of velocity at the predetermined rate toward the end of the extension portion of the cycle so as to cushion or dampen the return of the piston 12. This softens or avoids a sudden stop to reduce or avoid vibration and part bounce and increase production efficiency of the environment in which the spring 10 is used.

Accordingly, the gas spring 10 may be used within a press (not shown) to provide desired operation of, for example, a part lifter. In a part lifter application, full force of a gas spring may be desirable during a gas spring retraction stroke to effectively form a part, but a sudden stop at the end of a return stroke at the full force of the gas spring may cause undue vibration and part bounce. Thus, the gas spring 10 may provide its full net force during its retraction stroke and over at least an initial portion of its return stroke, but provides reduced net force and a predetermined deceleration over at least a final portion of the return stroke. As such, the gas spring force may be reduced at a desired rate before fully lifting a part to avoid vibration and part bounce at full extension of the gas spring, and this may extend the life of the gas spring 10 and increase production efficiency.

The cylinder 14 of the gas spring 10 may include a piston guide 20 carried in a casing or housing 22. As used herein, the cylinder 14 refers to the portion of the gas spring 10 that generally cooperates with the piston 12, and may include any shape and size, any quantity of components, and need not be cylindrical in shape. The housing 22 may be a common or standard gas spring canister, for example, to allow retrofit of an existing gas spring to be modified with the novel features described herein.

More specifically, the housing 22 may be a generally cylindrical component as shown, and may have a generally cylindrical wall 24 closed at one end by a cap or closed end 26 and substantially open at another end 28 to receive the piston 12 therein. Generally, the closed end 26 may be attached and sealed, for example, by a weld joint, or cast or formed as one piece with the cylindrical wall 24. The wall 24 of the housing 22 has an inner surface 30 that may at least partially define the spring chamber 16, and an outer surface 32. Near the open end 28 of the housing 22, the inner surface 30 of the wall 20 may include a generally circumferential retainer groove 34 constructed for receipt of a retaining ring 36, such as a C-style ring, to maintain the gas spring 10 in its assembled state. To facilitate mounting and locating the gas spring 10 within a press, circumferential grooves 38 may be formed in the outer surface 32 of the housing 22 adjacent the ends 26, 28 of the housing 22. For example, a retaining ring 40 may be disposed in one of the grooves 38 for cooperation with a flange mount 42 with a corresponding groove to accept the retaining ring 40.

The gas spring 10 may be a stand-alone or self-contained product that is pre-pressurized with gas, or may be linked in fluid communication to a supply or source of pressurized gas. In either case, to admit gas into the gas spring 10, the housing 22 may include a fill passage or port 44 extending between the inner and outer surfaces 30, 32 of the wall 24, shown here as extending through the generally closed end 26 of the housing 22. In a self-contained gas spring embodiment, a fitting 46 may be received in the fill port 44 to permit pressurized gas to be admitted into the gas spring 10. Although not shown, the fitting 46 could include a check valve to act as a one way valve to prevent the gas from exiting the gas spring 10 via the fill port 44.

The piston guide 20 may be at least partially carried by the housing 22 and may include a guide body 48 at least partially disposed in the housing 22. The body 48 may have a generally cylindrical outer surface 50 at least partially sized to be closely slidably received adjacent to the inner surface 30 of the housing 22, and a generally cylindrical inner surface 52 defining a through bore, through which a piston rod 66 of the piston 12 may slidably reciprocate.

Also, the piston guide 20 may include a skirt 54 extending axially from the guide body 48. The skirt 54 may have an inner surface 56 that may be concentrically arranged with the outer surface 50 of the body 48 and defining a shoulder 58 between the body 48 and the skirt 54. The skirt 54 may partially define an annular pocket in which at least a portion of the piston 12 may be received when the piston 12 is in and adjacent to its fully extended position.

The piston guide 20 may have generally opposite axial ends 60, 62. One end 62 may be received in the open end 28 of the housing 22 upon assembly of the piston guide 20 in the housing 22. The other end 60 may be generally flush with the open end 28 of the housing 22. To facilitate attachment of the piston guide 20 within the housing 22, the guide 20 may include a generally circumferential shoulder and/or groove 64 arranged to receive the retainer ring 36, which may be also received in the corresponding groove of the housing 22.

The piston 12 of the gas spring 10 may include a generally elongate piston rod 66 with one end 68 extending out of the housing 22 and adapted to be engaged with or attached to a ram, cam, lifter, binder ring, or the like of a press, and another end 70 received within the housing 22. A piston rod stop or spacer 72 may be adjustably coupled to the end 70 of the rod 66 for cooperation with the closed end 26 to adjustably limit travel of the piston rod 66. The piston rod 66 may be a common or standard gas spring piston rod, for example, to allow retrofit of an existing gas spring to be modified with the novel features described herein. The piston rod 66 may include a radially outwardly and circumferentially extending groove 74 adjacent to the end 70 that may be constructed to receive one or more other components of the piston 12.

For instance, another component of the piston 12 may include a piston collar 76 that may be assembled over the end 70 of the piston rod 66 and engaged with the groove 74 of the piston rod 66. The piston collar 76 may include a multiple-piece device coupled around the piston rod 66, a unitary component press fit to the piston rod 66, or the like. The piston collar 76 also may include one or more passages (not shown) therethrough for heat reduction during operation. In another example, the piston 12 may include a cushion collar 78 that may be assembled over the end 70 of the piston rod 66 and slid into abutment with a retaining ring 80 before the piston collar 76 is assembled. Alternatively, the cushion collar 78 may be assembled over the end 68 of the piston rod 66 and slid down the rod 66 into abutment with the piston collar 76 and then retained on the rod 66 by the retaining ring 80, which may be engaged in corresponding grooves in the rod 66 and the cushion collar 78. A seal 82 may be disposed in a corresponding groove in a radially inner surface 84 of the cushion collar 78.

Figure 7:
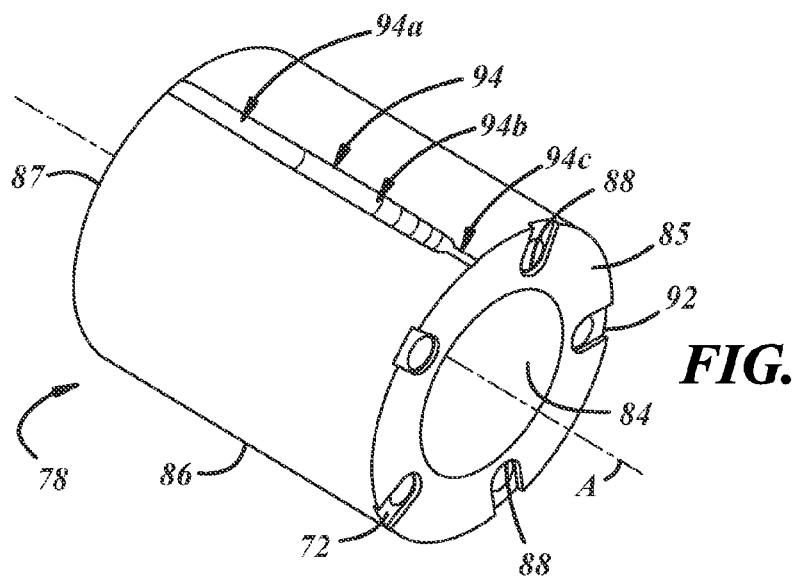
FIG. 7 is an enlarged perspective view of a cushion collar of FIG. 1.
Figure 8:
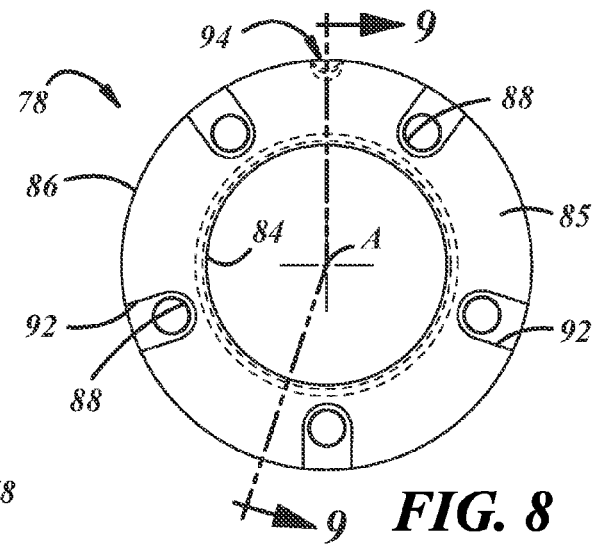
FIG. 8 is an end view of the cushion collar of FIG. 7.
Figure 9:
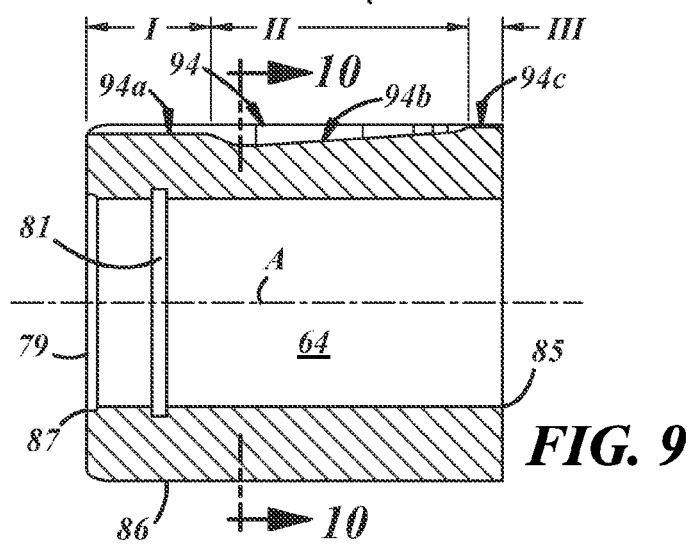
FIG. 9 is a sectional view of the cushion collar of FIG. 7, taken along line 9-9 of FIG. 8.

Referring also in general to FIGS. 7 through 9, the cushion collar 78 may be generally circumferentially continuous or annular with a radially outer surface 86, a longitudinal axis A, and may include generally axially opposed ends 85, 87. An annular seal groove 81 may be provided for the seal 82 between the ends 85, 87. Likewise, at one end 87, a retaining ring groove 79 may be provided for the retaining ring 80.

The cushion collar 78 also may include one or more transfer passages 88, 94 communicating at one end thereof with the cushion chamber 18 and at an other end thereof with the spring chamber 16. The transfer passages 88, 94 may provide, at least in part, for gas flow between the spring chamber 16 and the cushion chamber 18 during a portion of the piston 12 movement or reciprocation between its extended and retracted positions.

First, the transfer passages 88, 94 may include one or more check passages 88 that may be generally axially disposed in the cushion collar 78 between the ends 85, 87. The check passages 88 may be circumferentially closed, and axially open at the ends 85, 87. The check passages 88 may carry one or more check valves 90 (FIG. 1). For example, each of the check passages 88 may carry one check valve 90. At one end 85 of the cushion collar 78, the transfer passages also may include one or more vents 92 in fluid communication with the check passages 88. The vents 92 may be recessed and transversely disposed in the end 85 and in open communication with the external surface 86 of the cushion collar 78. As used herein, the term transverse includes any orientation at any non-zero angle with respect to a longitudinal axis L (FIG. 2) of the piston 12.

Second, the transfer passages 88, 94 also may include at least one throttling passage 94 disposed between the piston 12 and the cylinder 14. For example, the throttling passage 94 may be axially disposed in the external surface 86 of the cushion collar 78 and may extend completely between the ends 85, 87. As also used herein, the term axial includes a direction substantially parallel to the longitudinal axis L of the piston 12. In the illustrated embodiment, the passage 94 may be a groove or open channel in open fluid communication with the external surface 86 of the cushion collar 78 and, may be in open fluid communication with the ends 85, 87. In another embodiment, the passage 94 instead may be a groove or open channel in open fluid communication with the inner surface 56 of the skirt 54. As will be described herein below, the throttling passage 94 is of variable cross-sectional area as a function of the longitudinal height or length of the passage 94. Accordingly, as the piston 12 returns, flow through the passage 94 varies to provide controlled deceleration of the piston 12. The controlled deceleration may be variable deceleration.

Although a piston has been exemplified by the piston 12 described above, the piston could be constructed and arranged from more or less parts. One example includes an integrated or one-piece piston rod and collar that may carry the various seals, bearings, and passages described above.

The gas spring 10 also may include one or more bearings or bushings. For instance, the piston guide 20 may carry one or more guide bearings 96 in one or more corresponding grooves in the inner surface 52 of the guide 20 for cooperation with an external surface of the rod 66. In another instance, the piston collar 76 may carry one or more piston bearings 98 in a corresponding groove in an external surface thereof. The guide and piston bearings 96, 98 may facilitate guiding the piston 12 for axial reciprocation within the cylinder 14. Accordingly, the gas spring 10 provides increased guidance for the piston 12 because of the particularly long length of the guide bearings 96 and the spread or distance between the bearings 96 and 98. Gas can flow freely past the bearing 98 and piston collar 76 through slots in the bearing 98 and/or spaces between halves of the collar 76.

The gas spring 10 may include one or more seals. First, to facilitate a gas-tight seal between the piston guide 20 and the housing 22, a generally circumferential seal groove 100 may be provided in the outer surface 50 of the guide body 48 for receipt of a spring chamber seal 102 and a backup ring 104. The seal 102 may be an O-ring compressed between the seal groove 100 and the inner surface 30 of the housing 22. Second, a dust cover 106 may be disposed in the external annular groove 64 of the piston guide 20 proximate the open end 28 of the housing 22. Third, a rod wiper 108 may be disposed in a corresponding groove in the body 48 of the piston guide 20 at the end 60 thereof. The wiper 108 may include a lip to engage the piston rod 66 to prevent contamination or debris from entering the gas spring 10 between the guide body 48 and the piston rod 66. Fourth, the inner surface 52 of the guide body 48 may include a generally circumferential seal shoulder and/or groove 110 spaced axially from the wiper 108 and adapted to receive a rod seal 112 that sealingly engages the piston rod 66 to prevent gas from within the gas spring 10 from leaking out of the gas spring 10 between the piston rod 66 and the piston guide 20. Fifth, a groove 114 may be provided in the skirt 54 of the piston guide 20 to accept a cushion seal 116 and energizer 118. In another embodiment, where the throttling passage 94 is provided in the skirt 54 instead of the collar 78, the cushion seal 116 and energizer 118 may be provided in the collar 78.

During a portion of the gas spring cycle, the cushion seal 116 may separate the spring chamber 16 on one side of the cushion seal 116 from the cushion chamber 18 on another side of the cushion seal 116. The throttling passage 94 varies in cross-sectional area at the corresponding cushion seal 116 and with displacement or return of the piston 12. As used herein, the term "cross-sectional" includes cross sections taken at an angle transverse to the axis L.

In one illustrative implementation, the spring chamber 16 may be defined at least partially by the housing 22 and the piston 12. More specifically, the chamber 16 may be defined by the walls 24, 26 and by an axially facing surface area of the piston 12 within a diametric extent of the piston rod 66. Also, when the cushion seal 116 is in contact with the external surface 86 of the cushion collar 78, and bounding the passage 94, the cushion chamber 18 may be defined at least partially radially between the outer diameter of the piston rod 66 and an inner diameter of the skirt 54, and may be defined axially between the shoulder 58 and the end 87 of the cushion collar 78 within a diametric extent of the cushion seal 116.

The operation of the gas spring 10 will be described with reference to FIGS. 1-6. With the piston 12 received in the cylinder 14, and the piston guide 20 maintained within the housing 22 by the retaining ring 36, the gas spring 10 may be charged with gas through the fill port 44. Accordingly, the gas spring 10 maintains a charge of pressurized gas that yieldably biases the piston 12 and its rod 66 as an assembly to its extended position as shown in FIG. 1.

Typically, a plurality of the charged gas spring 10 may be received in a die assembly with a press ram, cam, part lifter, binder ring, or the like (not shown) abutting the end 68 of the extended piston rods 66. As a press ram is advanced, a die component may be urged, against the bias force of one or more of the gas springs 10, into engagement with a metal blank to be formed, punched, or the like. The piston rods 66 of the gas springs 10 may be compressed under the press force as press dies are moved toward closed positions to form the metal blank into a formed part. But the press ram may reach its fully extended position before the piston 12 bottoms out on the closed end 26 of the housing 22, thereby preventing damage to the gas spring 10.

As shown in FIGS. 1 and 2, when the gas spring 10 is in its steady state such that the piston 12 is in its fully extended or returned position, the spring chamber 16 is substantially at its maximum volume and the cushion chamber 18 is substantially at its minimum or zero volume.

Figure 3:
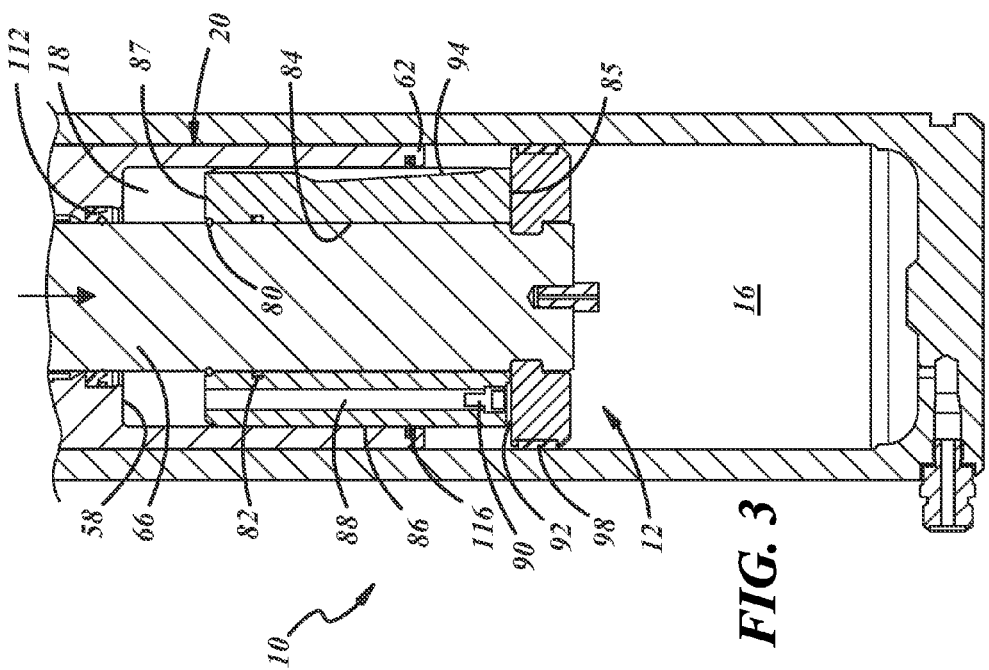
FIG. 3 is an enlarged, fragmentary view similar to FIG. 1 showing the piston moved from its extended position toward a retracted position.

As shown in FIG. 3, the piston 12 is being moved downwardly according to a retraction stroke of the gas spring 10. As the piston 12 is displaced or retracted, gas flows from an increasing space between the piston collar 76 and bearing 98 and the end 62 of the piston guide 20, and through the vents 92, the check valves 90, and the check passages 88, and into an increasing space of the cushion chamber 18 between the end 87 of the cushion collar 78 and the shoulder 58 of the piston guide 20. Gas also may flow from the increasing space between the piston collar 76 and bearing 98 and the end 62 of the piston guide 20, and through the throttling passage 94, and into the increasing cushion chamber 18.

Pressurized gas may flow from the spring chamber 16 to the cushion chamber 18, as the pressure in the chamber 16 increases due to movement of the piston 12 further into the spring chamber 16. This tends to maintain substantially the same gas pressure in each pressure chamber 16, 18. Accordingly, the transfer passages 88, 94 may be sized and provided in such a quantity to freely permit fluid flow between the pressure chambers 16, 18. The cushion seal 116 maintains separation between the chambers 16, 18 for at least part of the retraction stroke of the cycle.

But, as shown in FIG. 4, the piston 12 continues its downward movement during the retraction stroke such that only the spring chamber 16 remains defined. The cushion chamber 18 is no longer defined because movement of the piston 12 disengages the cushion collar 78 from the cushion seal 116 and the skirt 54.

After the retraction stroke, and with reference to FIG. 5, as the press ram is retracted, the piston 12 moves toward its extended position due to a return force of the pressurized gas acting on the end 70 of the piston rod 66. The cushion seal 116 may initially contact or re-engage the external surface 86 of the cushion collar 78. As a result, the check valves 90 close and the pressure chambers 16, 18 distinguish themselves, wherein the cushion chamber 18 is generally separate from the spring chamber 16 except for some permissible fluid communication via the throttling passage 94. As the piston 12 returns to its extended position, gas in the now re-defined cushion chamber 18 becomes compressed by the surface area of the cushion collar 78 between the seals 112, 116. Because the throttling passage 94 is in communication with the end 87 of the cushion collar 78, the compressed gas in the chamber 18 may flow at a controlled rate through the throttling passage 94 so that gas pressure in the chamber 18 may begin to equalize with the gas pressure in the spring chamber 16.

As shown in FIG. 6, the piston 12 has moved further toward its extended position. At this point, the cushion seal 116 is still in contact with the cushion collar 78. Gas in the cushion chamber 18 is compressed according to a differential in pressure between the chambers 16, 18 in response to movement of the piston 12 toward its extended position. This pressure differential between the chambers 16, 18 may be constant and produces a force acting on one side of the piston 12 from the cushion chamber 18 that opposes the force acting on the other side of the piston 12 from the spring chamber 16. But some limited amount of gas flows through the throttling passage 94, wherein throttling of the gas allows the forces acting on either side of the piston 12 to approach equilibrium at a controlled rate, until the piston 12 returns to its position shown in FIGS. 1 and 2. With reference also to FIG. 9, the distance from a transition point between zones II and III of the passage 94 to the seal 116 may be, for example, about 0.2 to 0.3 mm.

Therefore, the return of the piston 12 is delayed such that the velocity of the returning piston 12 is decreased at a controlled rate established by the flow of gas through the throttling passage 94. The controlled rate of decreasing velocity may be variable. In other words, the return velocity of the piston 12 decreases according to the rate of flow of gas from the cushion chamber 18 through the throttling passage 94 to the spring chamber 16. This gas flow rate varies in response to the cross-sectional area of the passage 94, which varies with displacement or return of the cushion collar 78 relative to the cushion seal 116 toward the fully returned position of the piston 12. During this particular portion of the cycle, the velocity of the returning piston 12 becomes less than the velocity of the press ram, which was driving the gas spring 10. As long as the velocity of the returning press ram is greater than that of the returning piston 12, the net force of the piston 12 on the press ram will be zero. The return velocity of the piston 12 ceases to be a function solely of gas pressure in the spring chamber 16 and the velocity becomes a function of the varying flow rate through the throttling passage 94.

Ultimately, although the gas pressure differential between the chambers 16, 18 may be constant, the piston 12 will be biased to its fully extended position as shown in FIGS. 1 and 2 because the gas is able to flow from chamber 18 to chamber 16 by way of the throttling passage 94 and, the gas acts on a greater surface area of the piston 12 in the spring chamber 16 than it does in the cushion chamber 18.

As a result of the varying differential force acting on the piston 12 as it travels over the final portion of its return stroke, press ram motion will be independent of or may encounter only a small force from the gas spring 10. The reduced or low impact force and velocity upon return of the press ram may reduce press vibration and part bounce. The varying cross-sectional area of the passage 94 enables the return velocity of the piston 12 to decrease at a controlled rate: slow enough to reduce or avoid sudden stops and part bounce, but fast enough for a good production rate.

Figure 11:
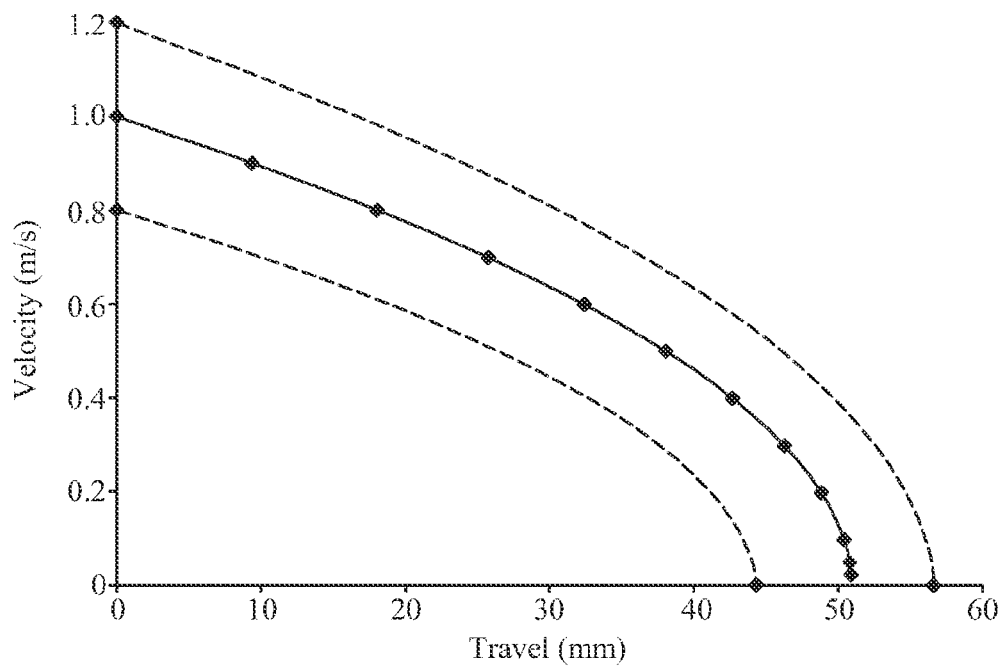
FIG. 11 is a graphical plot of Velocity as a function of Travel of a piston of an illustrative embodiment of a gas spring.

FIG. 11 illustrates a deceleration plot in the graphical form of example velocity values plotted against corresponding height values. FIG. 11 also illustrates upper and lower boundaries or a range of deceleration according to an example embodiment.

In one illustrative embodiment, for gas springs having about a 3 in. to 6 in. retraction stroke, the last about 1 in. to 5 in. of the return stroke may be cushioned. More specifically, the last about 2 in. to 3 in. of the return stroke may be cushioned. In other words, in one example, the last about ⅙ to ⅚ of the return stroke may be cushioned and, more specifically, the last about ½ to ⅔ of the return stroke may be cushioned. Such cushioning length may provide particularly good regulation of heat produced during the return stroke, and may enable a particularly good rate of operation in terms of cycles per minute. In other embodiments, it may be possible to provide a greater portion of the return stroke with cushioning, even up to the full length of the return stroke if desired.

Figure 12:
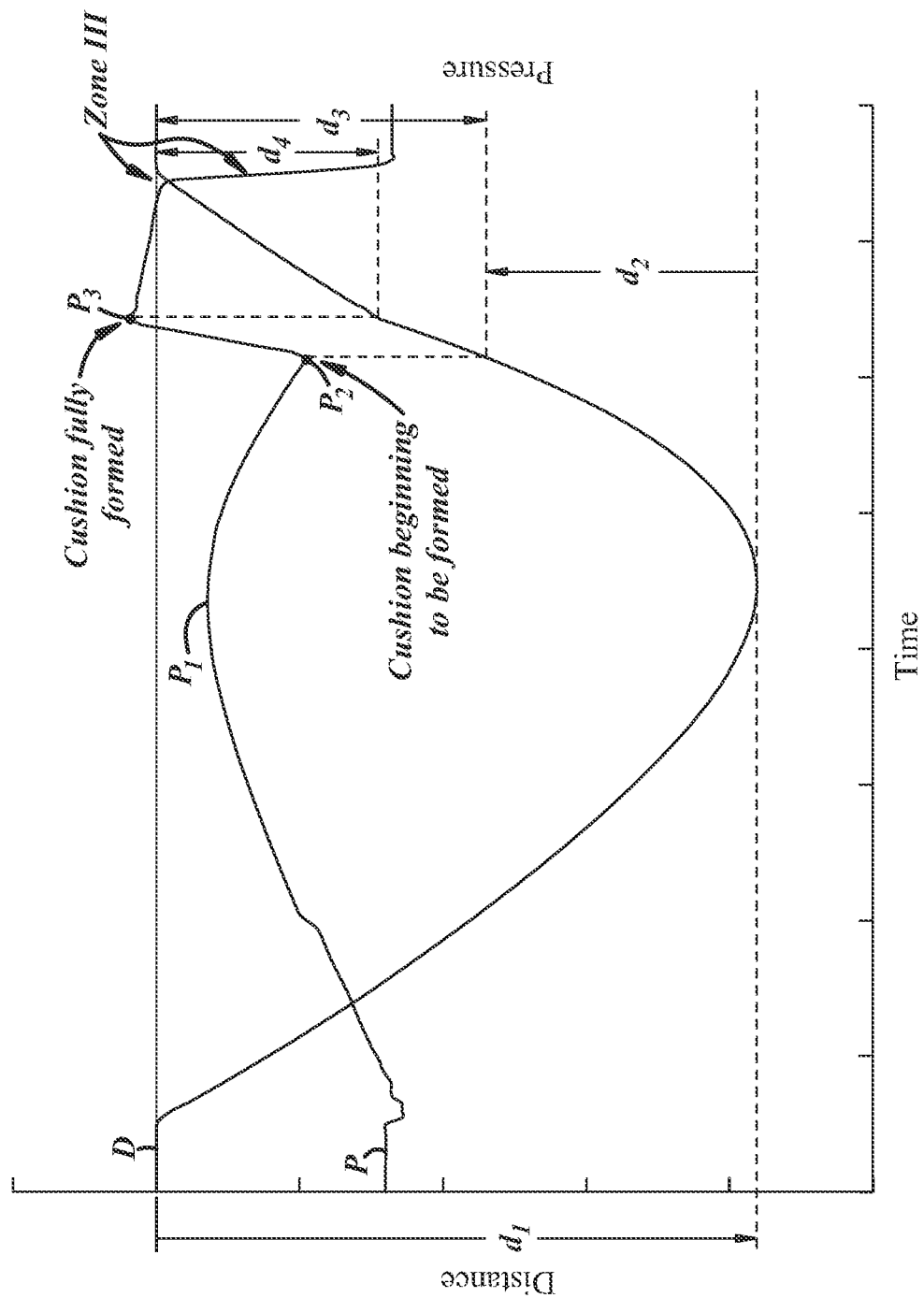
FIG. 12 is a graphical plot of Distance and Pressure versus Time for piston travel of an experimental gas spring having a cushion collar with constant depth throttling passage, that may be used to establish or verify data used to design the gas spring of FIGS. 1 through 9.

A particular, non-limiting example is explained below with reference to FIGS. 12 through 14 and Tables 1 through 3 to set forth illustrative calculations that may be used to determine an appropriate length of the skirt 54, depths of the passage 94, and the like.

With reference to Table 1 below, several parameters may be calculated using spreadsheet software and equations, and/or in any other suitable manner. In Table 1, the initial volume parameter is the maximum volume of the cushion chamber 18 when the cushion collar 78 is in sealing engagement with the cushion seal 116. Also in Table 1, the max cushion travel parameter is the maximum travel of the cushion collar 78 after engagement with the cushion seal 116 during return or extension of the piston. The initial volume parameter may be calculated once other design parameters of the gas spring 10 are decided upon or dictated by the particular gas spring application. The travel to equalize parameter is the distance during piston return or extension to compress the gas in the cushion chamber 18 to create the equalizing pressure, thereby allowing for the cushioning characteristics to take effect.

The initial volume and max cushion travel parameters may be adjusted to desired values, and used with other parameters and calculations from Table 1 to calculate the displacement or travel of the piston after equalization between the chambers 16, 18. That travel after equalization parameter, in turn, can be used as an input to determine incremental cross-sectional sizes of the throttling passage 94 and corresponding depths of cut for the throttling passage 94 as will described herein below with respect to Tables 2 and 3.

The equations of Table 1, particularly the volume at equalization, may use the ideal gas law with isothermal conditions. But the results may change +/−20% with more adiabatic conditions or with more or less gas leakage through the throttling passage 94. Also, it may be desirable to experimentally determine or verify the data of Table 1.

For instance, an experimental gas spring may be produced with a cushioning collar having a constant velocity throttling passage. For example, the experimental throttling passage may be of a constant depth of cut of about 0.057" to provide 0.3 m/s constant velocity. With reference to the graphical plot of FIG. 12, the experimental gas spring may be operated and tested using suitable displacement transducers, pressure sensors, data acquisition equipment, and the like. A first plot P represents the pressure produced by the experimental gas spring versus time as the experimental gas spring is cycled, and a second plot D represents the distance that the piston travels versus time.

In the first plot P, pressure rises to a first peak p1 as the piston reaches the bottom of its stroke, and then falls to an inflection point p2 corresponding to the position of the piston as shown in FIG. 5 wherein the cushion is initiated. Thereafter, pressure rises rapidly to a second peak p3 where the cushion is fully formed, then decreases according to flow through zones II and III of the throttling passage. As shown in FIG. 12, zone III of the cushion collar encompasses both the end of the relatively slow pressure decrease after p3 and also a rapid pressure decrease until the chambers 18 and 16 are equal in pressure, and the piston is fully extended as shown in FIG. 1.

In the second plot D, a first distance d1 represents retraction of the piston, and a second distance d2 represents a beginning portion of extension of the piston. A third distance d3 represents a maximum cushion travel or ending portion of the extension of the piston that begins when the cushion is initiated and ends when the piston is fully extended. A fourth distance d4 represents travel of the piston during extension after the cushion is fully formed such that equalization between the chambers occurs.

TABLE 1

| INITIAL VOLUME (in^3) | HOUSING SKIRT ID (in) | ROD OD (in) | INITIAL PRESSURE (psi) | MAX CUSHION TRAVEL (mm) |
|---|---|---|---|---|
| 11.51 | 3.356 | 1.969 | 250 | 1.510 |
| 8.847 | HOUSING ID AREA (in^2) = (Housing Skirt ID/2)^2*π | | | |
| 3.043 | ROD OD AREA (in^2) = (Rod OD/2)^2*π | | | |
| 5.804 | COUNTER ACTING AREA (in^2) = Housing Skirt ID Area – Rod OD Area | | | |
| 760.856 | INITIAL FORCE (lbf) = Initial Pressure * Rod OD Area | | | |
| 131.094 | EQUALIZING PRESSURE (gage - psi) = Initial Force/Counter Acting Area | | | |
| 381.094 | EQUALIZING PRESSURE ("abs" - psi) = Equalizing Pressure + Initial Pressure | | | |
| 8.517 | VOLUME AT EQUALIZATION (in^3) = Initial Volume * (Initial Pressure/Equalizing Pressure ("abs")) | | | |
| 2.993 | COMPRESSION VOLUME (in^3) = Initial Volume – Volume At Equalization | | | |
| 0.516 | TRAVEL TO EQUALIZE (in) = Compression Volume/Counter Acting Area | | | |
| 0.994 | TRAVEL AFTER EQUALIZATION (in) = Max Cushion Travel – Travel To Equalize | | | |

The size, shape, and quantity of the throttling passage(s) 94 may be determined in any suitable manner. In an illustrated embodiment, a ball nose end mill may be used to cut the throttling passage 94, and the throttling passage 94 may be at least partially semi-circular in cross-sectional shape and at least partially parabolic in longitudinal sectional shape. In other embodiments, however, any suitable milling tool, forming tool, casting tool, or any other suitable device may be used to produce the throttling passage 94 in any other suitable cross-sectional and/or longitudinal sectional shape(s). Accordingly, once one knows the basic design parameters of the gas spring 10, for example, from Table 1, as well as the desired size of the ball nose end mill, and the desired deceleration of the piston, then one can determine both the displacement height of the piston corresponding to the desired deceleration and the depths of the passage 94 at the corresponding displacement heights.

Table 2 includes the desired deceleration of the piston in the form of a plurality of discrete velocities of the piston. For example, the deceleration range may be dictated by the velocity of the press or press equipment in which the gas spring is used. In this example, nine discrete velocities were used, representing a desired deceleration range, from 0.675 m/s to 0.025 m/s. But any suitable deceleration range and velocity decrements may be used.

As shown in Table 2, the displacement height may be zeroed out for the lowest velocity increment (0.025 m/s). The 0.03 mm displacement height at that increment represents the distance of travel from the 0.025 m/s velocity increment to a theoretical 0.0 m/s velocity. The relationship between the cushion seal 116 and the end of the throttling passage 94 may be designed such that the piston 12 stops at the theoretical 0.0 m/s point or to allow two to three mm of travel at the 0.025 m/s point.

TABLE 2

| velocity | Displacement height | | depth of cut for 0.25" dia |  |
|---|---|---|---|---|
| (m/s) | (m) | (mm) | ball nose mill (in; mm) | |
| 0.025 | 0.0000 | 0.03 | 0.00 | 0.011 | 0.27 |
| 0.05 | 0.0001 | 0.13 | 0.10 | 0.017 | 0.43 |
| 0.1 | 0.0005 | 0.51 | 0.48 | 0.027 | 0.68 |
| 0.2 | 0.0020 | 2.04 | 2.01 | 0.043 | 1.10 |
| 0.3 | 0.0046 | 4.59 | 4.56 | 0.057 | 1.46 |
| 0.4 | 0.0082 | 8.15 | 8.12 | 0.070 | 1.78 |
| 0.5 | 0.0127 | 12.74 | 12.71 | 0.082 | 2.09 |
| 0.6 | 0.0183 | 18.35 | 18.32 | 0.094 | 2.39 |
| 0.675 | 0.0232 | 23.22 | 23.19 | 0.103 | 2.60 |

First, the travel or displacement height of the piston 12 corresponding to a particular desired velocity decrement may be calculated from the desired velocity decrement and assuming deceleration in accord with one unit of standard gravity (g). In general, the height may be calculated as follows.

$$\text{height}(m) = \frac{1}{2} \times \text{velocity}(m/s)^2 / g\,(m/s^2) \qquad \text{Eq. 1}$$

More specifically, the height corresponding to the initial velocity decrement may be calculated as follows: height=½* $(0.675\ m/s)^2/9.8\ m/s^2$=0.0232 m or 23.2 mm. Note that the height is less than the post-equalization travel of 0.994 in (25.25 mm) from Table 1. The height calculations may be repeated for each velocity decrement.

Second, the depths of the passage 94 at the corresponding displacement heights for the mill of known size may be calculated using spreadsheet software as represented by Table 3 below and its underlying equations, and/or in any other suitable manner. Table 3 displays various parameters and parameter values calculated from underlying equations related to mass flow through a truncated nozzle as described below.

TABLE 3

| Mass Flow Through A Truncated Nozzle | | |
|---|---|---|
| k | 1.4 | |
| R | 297 | J/kg K |
| T | 344 | K |
| $p_t$ | 2.628 | MPa |
| $p_b$ | 1.724 | MPa |
| $A_e$ | 1.199E–05 | m^2 |
| $p_b/p_t$ = | 0.656 | |
| $p^*/p_t$ = | 0.528 | |
| Because pb/pt > p*/pt flow must be subsonic | | |
| $M_e$ = | 0.8000 | |
| $T_e$ = | 304.962 | K |
| $\rho_e$ = | 19.031 | kg/m^3 |
| $c_e$ = | 356.095 | m/s |
| $\dot{m}$ = | 0.065 | kg/s |
| Corresponding Cushion Velocity | | |
| $\rho_t$ = | 25.718 | kg/m^3 |
| $m_t$ = | 0.0036 | kg |
| Cushion Duration | 0.055 | s |
| $V_{rod}$ = | 0.675 | m/s |
| Orifice/Passage Calculations | | |
| $r_1$ | 1.673 | in |
| $h_1$ | 0.004 | in |
| $d_1$ | 1.669 | in |
| $theta_1$ | 0.146 | rad |
| $K_1$ | 0.001 | in^2 |
| c | 0.244 | in |
| $r_2$ | 0.125 | in |
| $theta_2$ | 2.707 | rad |

TABLE 3-continued

Mass Flow Through A Truncated Nozzle

| | | |
|---|---|---|
| $K_2$ | 0.018 | in^2 |
| $d_2$ | 0.027 | in |
| $h_2$ | 0.098 | in |
| $h_3$ | 0.000 | in |
| $A_{rectangular}$ | 0.000 | in^2 |
| $h_{total}$ | 0.103 | in |

The parameters and example values from the left side of Table 3 may be described as follows. The parameter k is a unitless constant—the ratio of specific heat. R is the gas constant. T is the total temperature. The parameter $p_t$ is the equalizing pressure (absolute), for example, after unit conversion from Table 1. The parameter $p_b$ is the initial gas spring pressure, for example, after unit conversion from Table 1. The parameter $A_e$ is the cross-sectional area of the orifice or passage 94 at a given height corresponding to a given initial velocity increment as will be described in further detail below. The parameter p* is pressure when the Mach number is equal to unity and may be characterized according Eq. 2 below.

$$\frac{p_*}{p_t} = \left(\frac{2}{k+1}\right)^{k/(k-1)} \quad \text{Eq. 2}$$

The parameter $M_e$ is the Mach number and may be characterized according to Equation 3 below.

$$M_e = \sqrt{\frac{2}{k-1}\left[\left(\frac{p_t}{p_b}\right)^{(k-1)/k} - 1\right]} \quad \text{Eq. 3}$$

The parameter $T_e$ is static temperature and may be characterized according to Equation 4 below.

$$T_e = \frac{T_t}{\{1 + [(k-1)/2]M_e^2\}} \quad \text{Eq. 4}$$

The parameter $\rho_e$ is gas density at the orifice or passage 94 exit at the given height, and may be characterized according to Equation 5 below.

$$\rho_e = \frac{p_b}{RT_e} \quad \text{Eq. 5}$$

The parameter $c_e$ is the speed of sound at the orifice or passage 94 exit at the given height, and may be characterized according to Equation 6 below.

$$c_e = \sqrt{kRT_e} \quad \text{Eq. 6}$$

The parameter $\dot{m}$ is mass flow, and may be characterized according to Equation 7 below.

$$\dot{m} = \rho_e A_e M_e c_e \quad \text{Eq. 7}$$

The parameter $\rho_t$ is the total gas density in the cushion chamber 18, and may be characterized according to Equation 8 below.

$$\rho_t = \frac{p_t * 1000000}{RT} \quad \text{Eq. 8}$$

The parameter $m_t$ is the total mass of gas in the cushion chamber 18, and may be characterized according to Equation 9 below, wherein volume at equalization may be from Table 1 and multiplied by the unit conversion factor shown.

$$m_t = \rho_t(\text{volume at equalization} * 0.00001638706) \quad \text{Eq. 9}$$

The cushion duration may be characterized according to Equation 10 below.

$$\text{Cushion Duration} = \frac{m_t}{\dot{m}} \quad \text{Eq. 10}$$

The parameter $V_{rod}$ is the velocity of the piston 12, and may be characterized according to Equation 11 below, wherein travel after equalization may be taken from Table 1, multiplied by the unit conversion factor shown, and divided by the cushion duration.

$$V_{rod} = (\text{volume at equalization} * 0.00001638706)/(\text{cushion duration} * \text{counter acting area} * 0.00064516) \quad \text{Eq. 11}$$

Accordingly, once the basic gas spring design parameters are established, one can solve for the cross-sectional area $A_e$ required to produce the known desired velocity $V_{rod}$ and corresponding height. Once the cross-sectional area $A_e$ is solved, and knowing the size of the ball nose end mill to be used to cut the passage 94, one can determine the depth of cut at the corresponding height. For this, the orifice/passage parameters and underlying equations portion at the upper right of Table 3 may be used.

Figure 10:
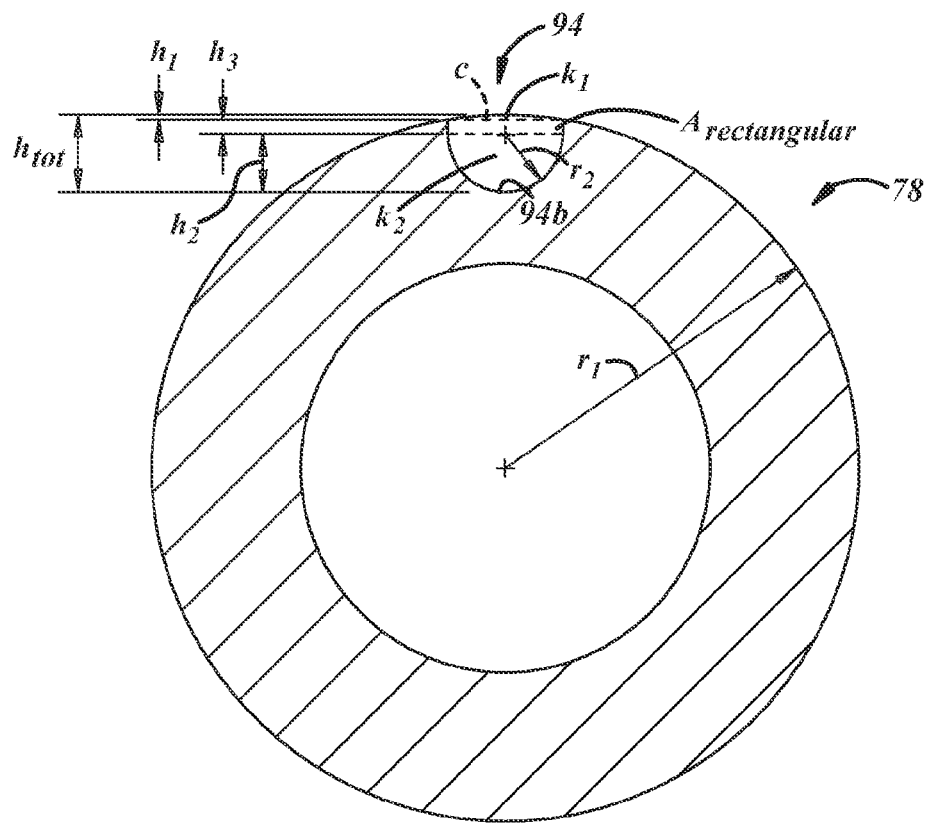
FIG. 10 is a cross-sectional view of the cushion collar of FIG. 7, taken along line 10-10 of FIG. 9.

Several of the parameters and example values from the upper right side of Table 3 are related to cross-sectional area calculations for segments of circles. With reference to FIG. 10, the parameters may be described as follows: $r_1$ is the outer radius of the cushion collar 78; $h_1$ is the height of a cross-sectional circular segment of the passage 94; $d_1$ is the distance from the center of the cushion collar 78 to a midpoint of a chord c defining a circle segment $K_1$; theta$_1$ is the central angle for the segment $K_1$ and is equal to an arc length of the segment $K_1$ divided by $r_1$; $r_2$ is the radius of the ball nose end mill used to generate the passage 94, theta$_2$ is the central angle for a circle segment $K_2$ and is equal to an arc length of the segment $K_2$ divided by $r_2$; and $d_2$ is the distance from a midpoint of the chord defining the circle segment $K_2$ to the center of the circle.

Another representation for parameter d is provided in Equation 12.

$$d = r - h \quad \text{Eq. 12}$$

Another representation for parameter K is the area of the circle segment, and may be characterized according to Equation 13 below.

$$K = r^2 * (\text{theta} - \sin(\text{theta}))/2 \quad \text{Eq. 13}$$

Because the throttling passage 94 may be machined with a ball nose end mill, the cross-sectional area $A_e$ of the passage 94 may be applied to semi-circle related formulas or equations to solve for the depth of cut. However, if the depth of the passage 94 is deeper than the radius of the ball nose end mill, an additional depth $h_3$ and corresponding rectangular area $A_{rectangular}$ may be calculated. Likewise, another additional depth $h_2$ of the ball nose end mill may be calculated. The maximum additional depth $h_2$ is the diameter of the ball nose end mill.

Finally, $h_{total}$ is the total depth of the passage 94 including the depth $h_1$, part or all of the depth $h_2$ associated with the end mill radius, and any additional depth $h_3$, which is required to provide the desired piston velocity at the corresponding height according to the desired deceleration schedule. FIG. 10 illustrates an example where the ball nose end mill has plunged to a depth of cut that is greater than its radius.

One of ordinary skill in the art will recognize that the equations and spreadsheet of Tables 1-3 may be used for manually, iteratively determining the depths of cut at each of a plurality of discrete desired velocity decrements and corresponding heights. One of ordinary skill will also recognize that the equations and parameter values may be incorporated in a computer program for automatically solving for the depth (s) of cut on a discrete or continuous basis.

It should be recognized that one of ordinary skill in the art will devise modifications, variations and other embodiments encompassed within the scope of this invention. The embodiments described above are intended to be illustrative and not limiting. The scope of the invention is defined by the claims that follow.

I claim:

1. A gas spring for forming equipment, comprising:
a cylinder having an inner cylindrical surface at least in part defining a first pressure chamber constructed to receive a pressurized gas in the first pressure chamber;
a piston at least partially received in the first pressure chamber of the cylinder for reciprocation between extended and retracted positions over a cycle including a retraction stroke and a return stroke and yieldably biased to the extended position by pressurized gas in the first chamber;
a cushion seal disposed between the cylinder and the piston, not carried by the piston, and, during at least a portion of the movement of the piston to the extended position the piston moves relative to the cushion seal to separate and seal the first pressure chamber on one side of the cushion seal from a second pressure chamber defined by the cylinder and the piston on another side of the cushion seal;
at least one check passage having a bore carried by the piston and while the piston engages the cushion seal the check passage communicates at one end with the second pressure chamber and at another end with the first pressure chamber;
at least one check valve in the bore of the check passage which closes when the piston engages the cushion seal as the piston moves toward its extended position to inhibit gas flow through the check passage from the second pressure chamber to the first pressure chamber; and
at least one throttling passage separate from the check passage and check valve, carried by the piston, disposed between the piston and the cylinder, not in the inner cylindrical surface of the cylinder, and while the piston engages the cushion seal the at least one throttling passage communicates at one end with the second pressure chamber and at an other end with the first pressure chamber;
the at least one throttling passage is configured to at least partially restrict gas flow therethrough from the second pressure chamber to the first pressure chamber by its cross-sectional area over at least a part of its longitudinal extent varying and decreasing toward its end communicating with the first pressure chamber so as to reduce velocity of the piston at a predetermined rate during the return stroke as the piston returns to its fully extended position.

2. The gas spring of claim 1, wherein the at least one throttling passage varies in cross-sectional area at the cushion seal with displacement of the piston.

3. The gas spring of claim 1, wherein the at least one throttling passage is a groove open to an external surface of the piston, wherein the cushion seal bounds the groove.

4. The gas spring of claim 3, wherein the cylinder includes a housing having an inner surface defining at least part of the first pressure chamber, and a piston guide received at least partly in the housing and having a through bore and also having an outer surface with a portion disposed generally adjacent to the inner surface of the housing.

5. The gas spring of claim 4 wherein the piston includes a piston rod and a piston collar carried by the piston rod, wherein the piston rod is at least partially disposed in the through bore of the piston guide for reciprocation between the extended and retracted positions, and wherein at least part of the second pressure chamber is defined between the piston and the piston guide during at least a portion of the reciprocation of the piston.

6. The gas spring of claim 5 wherein the piston further comprises:
at least one bearing carried in at least one corresponding groove in an inner surface of the piston guide for cooperation with an external surface of the piston rod; and
at least one bearing carried in a corresponding groove in an external surface of the piston collar;
so as to facilitate guiding the piston within the cylinder during at least a portion of the reciprocation of the piston.

7. The gas spring of claim 5 wherein the piston guide includes a guide body, and a skirt axially depending from the guide body and the piston is at least partially disposed in the skirt when the piston is in its extended position.

8. The gas spring of claim 7 further comprising a piston rod seal disposed between the piston rod and the guide body, and wherein the piston further includes a cushion collar carried by the piston rod between the piston collar and the guide body, wherein the first pressure chamber is defined by the housing and a portion of the piston on one side of the cushion seal when the cushion seal is in contact with the cushion collar, and the second pressure chamber is defined by another portion of the piston and the piston guide between the piston rod seal and the cushion seal when the cushion seal is in contact with the cushion collar.

9. The gas spring of claim 1 wherein the piston disengages from the cushion seal during the retraction stroke of the piston.

10. The gas spring of claim 9 wherein the piston re-engages the cushion seal during a return stroke of the piston, at which point the pressure chambers are in fluid communication only through the throttling passage.

11. The gas spring of claim 1, wherein each of the at least one throttling passage is of variable cross-sectional area, which varies with a length of the passage.

12. A gas spring for forming equipment, comprising:
a cylinder having an inner cylindrical surface at least in part defining a first pressure chamber constructed to receive a pressurized gas therein;
a piston received at least partially in the first pressure chamber of the cylinder for reciprocation between extended and retracted positions and to partially define the first pressure chamber between one side of the piston and the cylinder and to partially define a second pressure chamber on another side of the piston, and the piston yieldably biased to a fully extended position by pressurized gas in the first pressure chamber;

a collar carried by the piston for reciprocation with the piston;

a cushion seal carried by the cylinder and engaging the collar during a portion of the movement of the piston to the extended position of the piston to separate the first pressure chamber on one side of the cushion seal from a second pressure chamber on the other side of the cushion seal, a passageway wholly within the collar and while the collar engages the cushion seal the passageway communicates adjacent one end with the second pressure chamber and adjacent another end with the first pressure chamber;

a check valve which communicates with the passageway and closes when the collar engages the cushion seal as the piston moves toward its extended position to inhibit gas flow through the passageway from the second pressure chamber to the first pressure chamber;

a throttling passage separate from the passageway and check valve, not in the inner cylindrical surface, and disposed between the collar and the cylinder in fluid communication between the first and second pressure chambers during at least a portion of movement of the piston from its retracted position to its fully extended position; and a cross-sectional area of the throttling passage is constructed to at least partially restrict gas flow therethrough from the second pressure chamber to the first pressure chamber with its cross-sectional area over at least a part of its longitudinal extent varying and decreasing toward its end communicating with the first pressure chamber to decelerate the return of the piston to its fully extended position.

13. The gas spring of claim 12, wherein the at least one throttling passage is a groove open to an external surface of the piston, and a cushion seal bounds the groove.

14. The gas spring of claim 13, wherein the cylinder includes a housing having the inner cylindrical surface defining at least part of the first pressure chamber, and a piston guide received at least partly in the housing and having a through bore and also having an outer surface with a portion disposed generally adjacent to the inner cylindrical surface of the housing.

15. The gas spring of claim 14 wherein the piston includes a piston rod and the collar is carried by the piston rod, wherein the piston rod is at least partially disposed in the through bore of the piston guide for reciprocation between the extended and retracted positions, and wherein at least part of the second pressure chamber is defined between the piston and the piston guide during at least a portion of the movement of the piston to its fully extended position.

16. The gas spring of claim 15 wherein the piston further comprises:
   at least one bearing carried in at least one corresponding groove in an inner surface of the piston guide for cooperation with an external surface of the piston rod; and
   at least one bearing carried in a corresponding groove in an external surface of the piston collar;
   so as to facilitate guiding the piston within the cylinder during at least a portion of the reciprocation of the piston.

17. The gas spring of claim 16, wherein the piston guide includes a guide body, and a skirt axially depending from the guide body and within which the collar is at least partially disposed in the extended position of the piston, and wherein the first pressure chamber is defined by the housing and a portion of the piston on one side of the cushion seal when the cushion seal is in contact with the cushion collar, and the second pressure chamber is defined by a portion of the collar and the piston guide between the piston rod seal and the cushion seal when the cushion seal is in contact with the collar.

18. The gas spring of claim 12 wherein the collar disengages from the cushion seal during the retraction stroke of the piston, and the collar re-engages the cushion seal during a portion of the return stroke of the piston, at which point the pressure chambers are in fluid communication only through the throttling passage.

* * * * *